W. G. KRUKE.
WHEEL FOR VEHICLES.
APPLICATION FILED NOV. 13, 1911.
1,067,525.
Patented July 15, 1913.
4 SHEETS—SHEET 4.
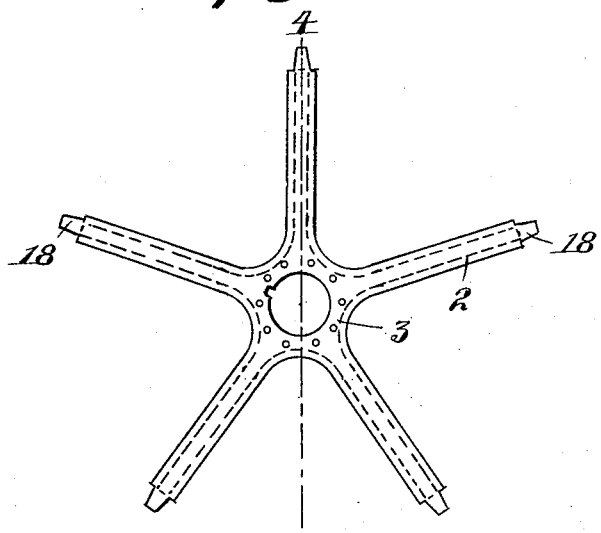
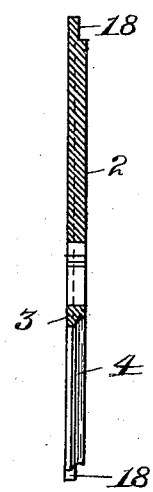
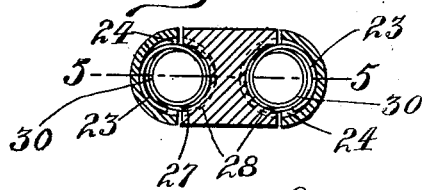
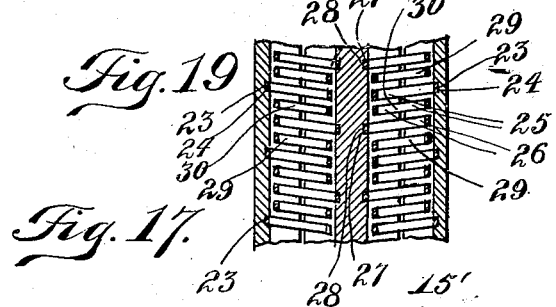
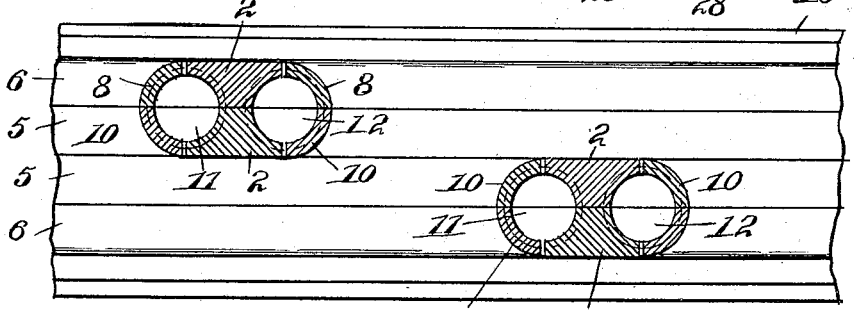
Witnesses:
C. W. White
J. T. Ray
Inventor:
Walter G. Kruke,
By his Attorney, A. B. Mattingly
COLUMBIA PLANOGRAPH CO., WASHINGTON, D. C.

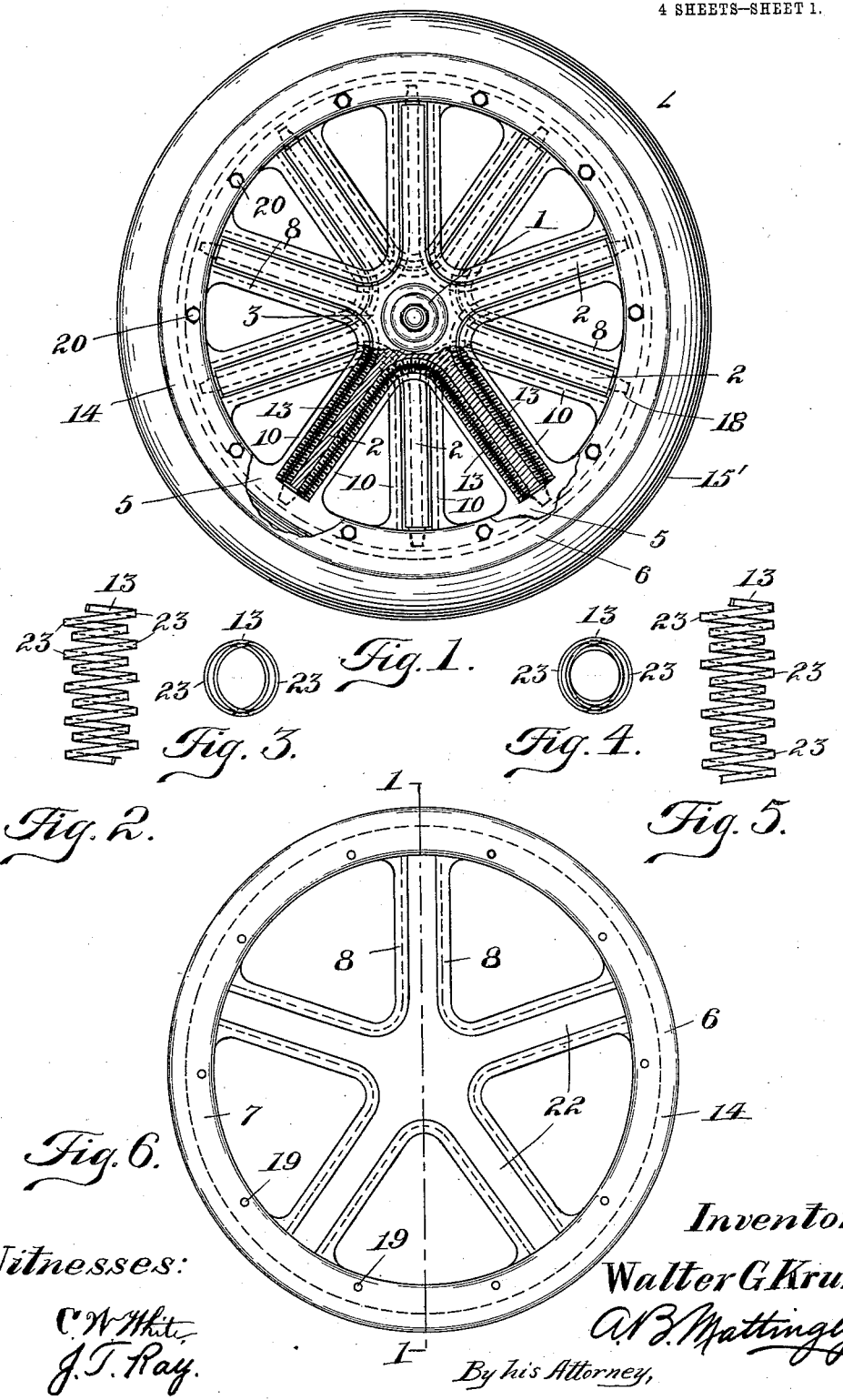

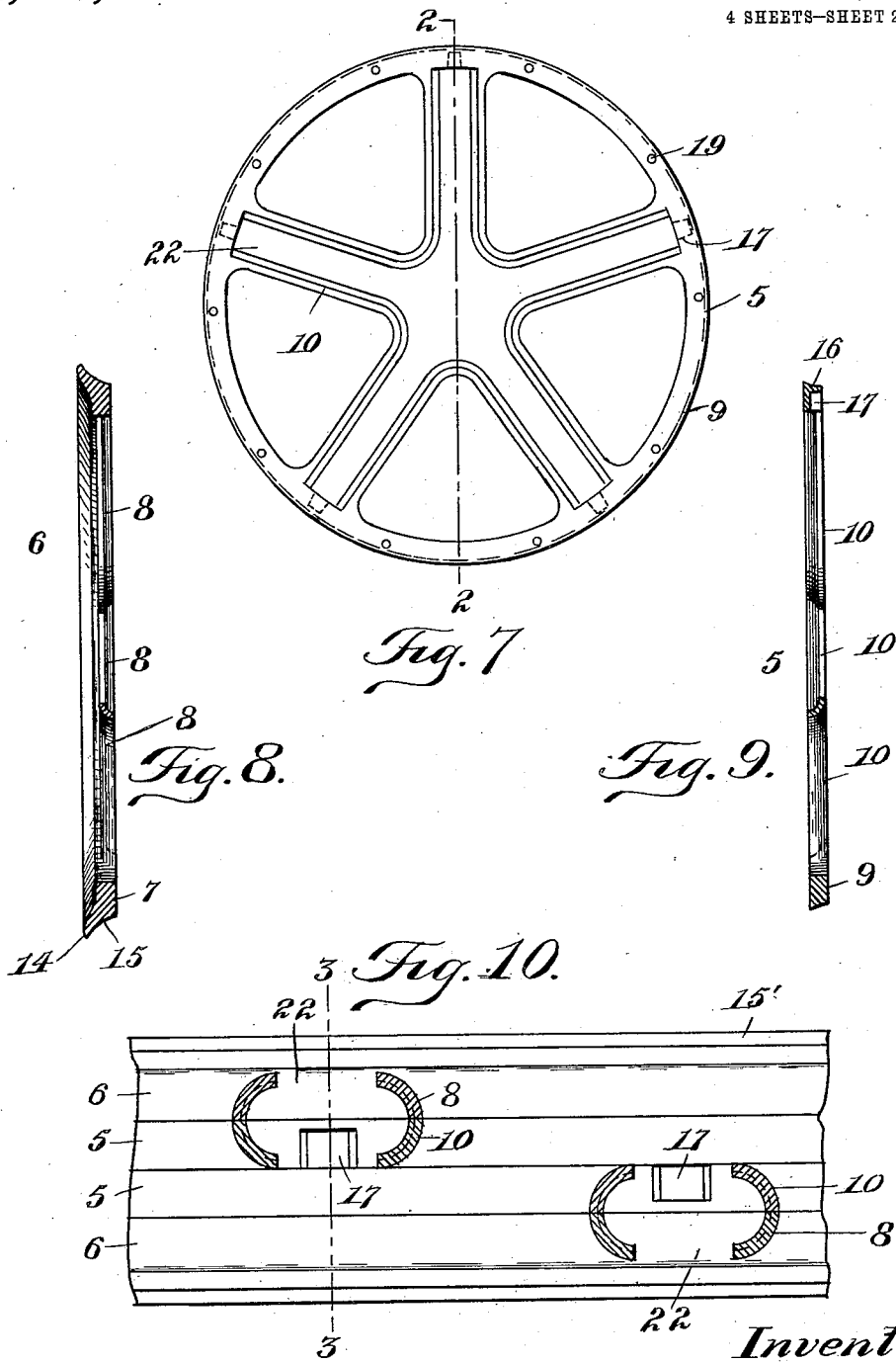

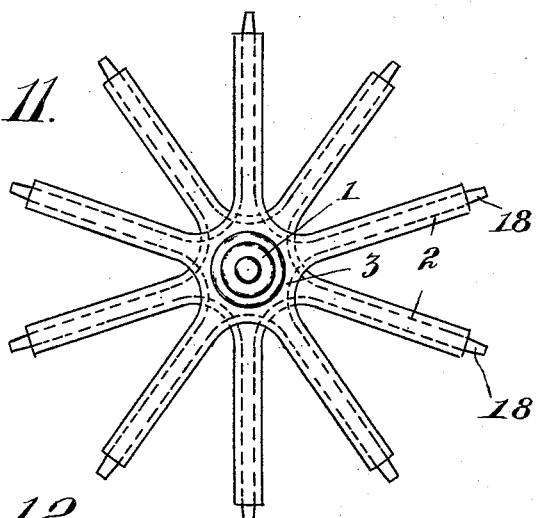
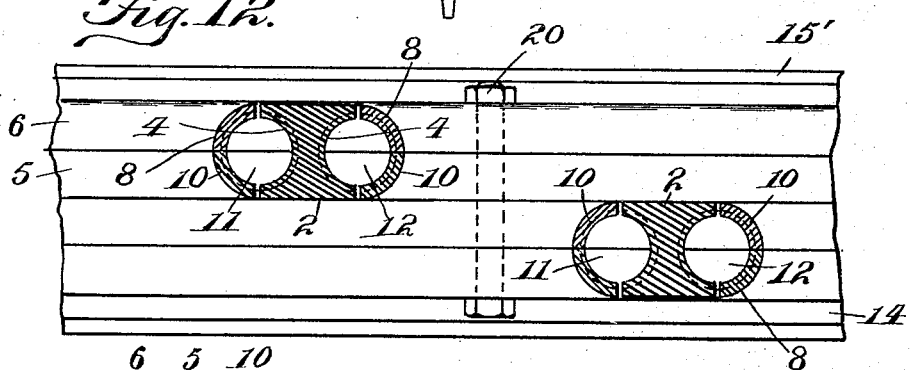
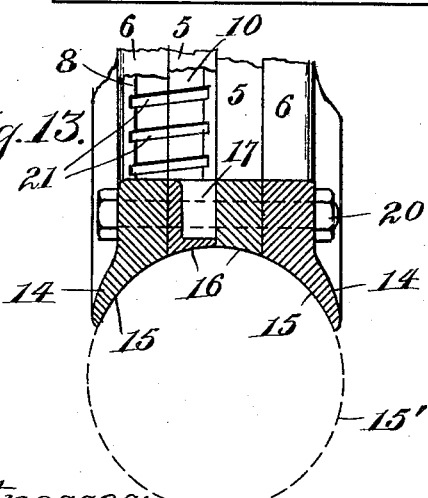
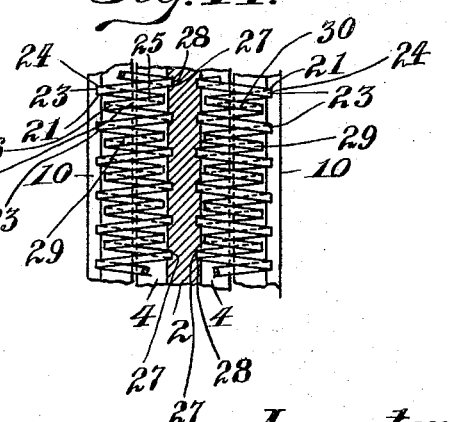

UNITED STATES PATENT OFFICE.

WALTER G. KRUKE, OF CORNING, NEW YORK.

WHEEL FOR VEHICLES.

1,067,525.  Specification of Letters Patent.  Patented July 15, 1913.

Application filed November 13, 1911. Serial No. 660,123.

*To all whom it may concern:*

Be it known that I, WALTER G. KRUKE, a citizen of the United States, and resident of Corning, in the county of Steuben and State of New York, have invented certain new and useful Improvements in Wheels for Vehicles, of which the following is a specification.

This invention relates to improvements in wheels for vehicles, and more especially to that class of vehicles which are power driven and used as pleasure cars.

The object of this invention is to provide a wheel of this character to take the place of the pneumatic tire wheel, which has its disadvantages in regard to keeping the tires properly inflated and insured against puncture, and to secure a resiliency to the wheel so as to absorb the shocks due to the uneven roadway.

A further object is to provide an inexpensive wheel which is durable and light as regards the strain put upon it and still have a resilient property to absorb the shocks due to the irregularities of the road bed.

A still further object is to provide a wheel of this character which may be made if desired entirely of metal.

With these and other objects in view, it will be seen that I have accomplished the foregoing results by referring to the drawings and specification hereto annexed and forming a part of this application, in which—

Figure 1 is a side elevation of my improved wheel with a part broken away; Fig. 2 is a side elevation of a portion of the spring used in the construction; Fig. 3 is a transverse section of the spring shown in Fig. 2; Fig. 4 is a transverse section of another style of spring which may be used; Fig. 5 is a side elevation of a portion of the spring which is shown in Fig. 4; Fig. 6 is one of the outside plates or rims; Fig. 7 is one of the inside plates or rims; Fig. 8 is a sectional view taken on the line 1—1 of Fig. 6; Fig. 9 is a section taken on the line 2—2 of Fig. 7; Fig. 10 is a section taken through the spoke members of the rims showing all of the four plates in position, the spoke members of the hub being omitted; Fig. 11 is a side elevation of the hub and its spoke members; Fig. 12 is a similar view to Fig. 10, but showing the spoke members of the hub in their relative positions; Fig. 13 is a sectional view on the line 3—3 of Fig. 10; Fig. 14 is a section taken at right angles to the axis of the hub and through the spoke members of the rim and hub, showing the springs in position; Fig. 15 is a side elevation of one of the hub members; Fig. 16 is a sectional view on the line 4—4 of Fig. 15; Fig. 17 is a similar view to Fig. 12, showing the hub member made up of four pieces; Fig. 18 is a transverse section taken through the spoke members and showing the coil springs; and Fig. 19 is a vertical section taken on line 5—5 of Fig. 18.

I have not deemed it necessary to show any modified forms of my wheel, yet there may be many modifications made therein without departing from the scope or spirit of my invention.

It will be seen that I provide the usual hub 1 of the well known type. The hub may be made integral with the spoke members 2 or attached in any suitable manner thereto by the secondary hub 3 formed by the abutting of the spoke members. I have shown the spoke members lying in two planes in reference to the axis of the wheel and in a staggered position in regard to one another. Now, the spoke members may be formed in one piece, but I prefer to make them in two or four pieces, which will be alike, and bolt them together in their staggered position and then secure any style of hub that is desired into the secondary hub 3. The spoke members 2 are provided with grooves or channels 4 in the form of a half circle, which are on both sides of the spoke member and extend from its outer end to and across the hub at right angles to its axis and then to the outer end of the adjoining spoke member. The rim members, of which there are two styles used in duplicate to form the wheel, consist of what I will term for convenience the inside plate 5 and the outside plate 6. When I use the terms "inside" and "outside" with reference to the wheel I wish it understood that I do not mean it in the sense in which it is generally understood as regards the way in which the wheel is put on the vehicle. The terms are used as regards an individual wheel, and mean the inside and outside of the structure in accordance with the way it is assembled. The outside plate consists of an annular rim portion 7 having made integral with it spoke members 8 in angular form and pointing or projecting toward the axis of the wheel and conforming with the space between the spoke members of the hub. The spoke members 8 are in the form of a quarter of a circle in sectional form, as clearly shown in Figs. 10 and 12, and having their curvature toward the inside of the wheel. The inside plates 5 are composed of an annular rim portion 9 and having spoke members 10 which conform to the shape of the outside plate spoke members, but instead of having their curvature toward the inside of the wheel they have it reversed. It will be seen by referring to Fig. 12 that when the wheel is assembled the four spoke members form what might be termed spokes of the wheel which have two circular bores 11 and 12 formed within each spoke of the wheel to receive the coil springs 13. The annular portion of the outside plates is provided with a flange 14 extending outwardly. The inside of the flange, and where it joins the rim portion, is curved to conform to the tire 15′. The annular portion of the inside plates has its periphery slightly curved, as at 16, and made to register with the curvature 15 of the outside plate. By referring to Fig. 13 it will be seen that the curvatures 15 and 16 when the wheel is assembled form a channel or groove for the tire, which may be made of any suitable material. The inside plates are further provided with recesses 17 in the annular portion thereof for the reception of the parts 18 at the outer ends of the spoke members 2 of the hub. The outside and inside plates are further provided with holes 19 through which the bolts 20 pass and hold the wheel in its assembled position. The bores 11 and 12 may be formed with transverse grooves or channels 21, or spiral grooves or channels as shown in Figs. 13 and 14, for the purpose to be hereinafter described.

It will be noted that when the side plates are assembled their spoke members form ways 22 to receive the spoke members of the hub, and these ways 22 are in a staggered position to correspond to the staggering of the spoke members. This staggering of the spoke members is to take the side strains when the vehicle is going in a curved direction and also to relieve the strain upon the parts of the spoke members of the hub. This allows the spoke members to have a free parallel movement relatively to each other and to act upon the springs which are contained in their grooves or channels forming the bores 11 and 12, which give them a buoyancy as regards each other if a plain coil spring is used, but a great amount of buoyant or resilient movement may be obtained by using my improved coil spring, of which I have shown two forms in Figs. 2 to 5 inclusive, but many modifications may be made thereof. I have shown the springs made from a square body wire, but this is not absolutely essential, as a round or other shaped wire may be used.

By referring to Fig. 14 it will be seen that certain portions 23 of the coils fit into the grooves or channels 21 of the bores 11 and 12 and form a great many spring bearings between the spoke members of the rims and hub and act as numerous spring toggles to receive the strain of the jars when the tire of the wheel strikes an obstruction. It will be seen that when the tire strikes an obstruction the shock has to pass from the rim through its spoke members and thence through the various coils, where it is absorbed before it can be transmitted to the spoke member of the hub and from there to the axle. In this construction it will be noted that the springs have a resilient quality in two directions, that is, parallel and transversely to their axes.

It will be seen by referring to Figs. 13, 14, 18 and 19 that the coil spring has one half of a convolution 23 extending into a socket or groove 24 in the spoke member of the rim and that the other half 25 of this convolution is smaller than the inner diameter of the bore between the spoke members, and hence the spoke member of the hub will move freely in the ways 22 formed by the spoke members of the rim. The next adjoining half 26 of the convolution is of the same size, making a whole convolution 30 of the smaller diameter which will move freely in the bore. The next adjoining half convolution 27 is enlarged and extends into a socket or groove 28 in the opposite side or spoke member of the hub forming the bore. The next convolution 29 adjoining the half convolution 27 and the half convolution 23 of the next series of convolutions, is of the same diameter as the convolution 30 formed by the halves referred to above as 25 and 26 and performs the same functions as the convolution 30. Therefore, when one of the spoke members slides on or moves with regard to the other member, the large portions 23 and 27 of the coils will move together and will compress the whole convolutions 29 and 30 of smaller diameter that lie between them in the bore, or will expand the intermediate or smaller coils 29 and 30 if moved in the other direction. If the two spoke members are caused to approach each other, the half coils in the sockets 24 and 28 will serve to compress the whole coils 29 and 30 between them, thus providing for resisting and absorbing the strains both laterally and longitudinally of the spokes.

It will be noted that the springs shown in Figs. 18 and 19 are of a slightly different construction than those shown in Fig. 14, but are similar to that shown in Figs. 4 and 5. The partial convolutions 25 and 26 referred to above are more than a half convolution, and the convolutions 29 and 30 are more than a whole convolution, but the operation or movements are the same as already described for the style of spring shown in Fig. 14. This construction gives the springs more elasticity, or a freer movement, than the style shown in Fig. 14.

While I have not shown in the main view of the drawing the hub made of four pieces, it will be readily understood that by using four duplicate pieces, as shown in Figs. 15, 16 and 17, the hub member may be built up the same as the rim to cheapen the manufacture of the same. It will be understood that the four pieces of the hub member may be made in the same set of dies and all that will be necessary is to cut the trunnions 18 off of two of the members, which are assembled on the outside of the wheel.

It will be seen by the foregoing that I have invented a very economical and durable wheel, neat in appearance, and having a high degree of resiliency.

I have designed the several parts of the wheel so that they may all be made of drop forging, which will facilitate the manufacture thereof and permit them to be very light, durable and neat in appearance, and by having both sides alike from the center line of the wheel it makes it a very economical article of manufacture.

Having thus described my invention, what I claim is:

1. In a wheel, a hub member having channeled spokes radiating therefrom, a rim member having channeled spokes secured thereto and projecting inwardly in proximity to said spokes with the channels registering in the two sets of spokes, and coil springs secured in the registering channels to receive the load between the hub and the rim, the alternate convolutions of the coils engaging alternately with the channeled part of the spokes of the two said members.

2. In a wheel, a hub member having channeled spokes radiating therefrom, a rim member having channeled spokes secured thereto and projecting inwardly in proximity to said spokes with the channels registering in the two sets of spokes, the opposed channeled portions of the spokes having sockets, and spring members located in the registering channels to receive the load between the rim and the hub, the spring members engaging the socket portions of the spokes and adapted to receive and absorb strains both laterally and longitudinally of the spokes.

3. In a wheel, a hub member having channeled spokes radiating therefrom, a rim member having channeled spokes secured thereto and projecting inwardly in proximity to said spokes with the channels registering in the two sets of spokes, the opposed channeled portions of the spokes having sockets, and coil springs located in the registering channels to receive the load between the hub and the rim, the alternate convolutions of the coils engaging the socket portions of the spokes of the two sets.

4. In a wheel, a hub member having spokes radiating therefrom, each having a pair of channeled portions, a rim member having spokes secured thereto and projecting inwardly, the rim spokes having a pair of channeled portions registering with said channeled hub spokes respectively, the spokes of the rim member having connections at the inner portions that contain channels connecting with the said channels of such spokes, and coil springs each having one end portion located in the registering channels of one double spoke member and its other end portion located in the registering channels of the adjacent double spoke member and the intermediate part of the coil spring being located in the connecting channel of the rim spoke and also adjacent the hub.

5. In a wheel, a hub member having spokes radiating therefrom, each having a pair of channeled portions, a rim member having spokes secured thereto and projecting inwardly, the rim spokes having a pair of channeled portions registering with the channels in the hub spokes respectively, the spokes of the rim member having connections at the inner ends that contain channels connecting with the channels of the spokes, the hub member having portions connecting the spokes that contain channels connecting the channels of the spokes, and coil springs each having one end portion located in the registering channels of one double spoke member and its other end portion located in the registering channels of the adjacent double spoke member and the intermediate part of the coil spring being located in the said registering connecting channels of the hub and rim members.

6. In a wheel, a hub member having spokes radiating therefrom that have on each of two opposite sides a channel portion, a rim member having pairs of spokes secured thereto and projecting inwardly and having connections at the inner ends, said pairs of spokes being located in proximity to said channeled faces of the hub spokes and having channels registering therewith, the hub having channeled portions registering with the channeled portions of the said spoke connections, and coil springs each having one end portion located in the registering channels on one side of the hub spoke member and its other end portion located in the registering channels of the adjacent side of the next spoke member with the intermediate portion of the spring located in the channel between the said spoke connection and the hub.

7. In a wheel, a hub member having spokes radiating therefrom, a double rim member formed of sections, each section comprising a rim portion and a spoke portion, the sections being secured together to cause the spoke portions to form a channel and such channels having opposed socket portions, the hub spokes having channel portions registering with the said channel portions of the rim member and having socket portions, and coil springs located in said channel portions with the alternate convolutions located in the said socket portions of the channels.

8. In a wheel, a hub member having spokes radiating therefrom, a double rim member formed of sections, each section comprising a rim portion and a spoke portion, the sections being secured together causing the spoke portions to form a channel, said spoke portions having connections at their inner ends containing channels merging into said channels, the hub spokes having channels registering with channel portions of the rim spokes, the hub also having channel portions registering with the said channeled connections of the rim member, and coil springs located in said registering channels between the spokes by its end portions with the intermediate portion located in the channels between the said connections and the hub portion, said channeled portions having sockets therein, the coil springs having the alternate convolutions enlarged and located in said sockets.

9. In a wheel, a hub member having spokes radiating therefrom that have on each of two opposite sides a channel portion, a double rim member formed of sections, each section comprising a rim portion and a pair of spoke portions secured to the rim portions and projecting inwardly and having channeled connections at their inner ends, the sections being secured together causing the spoke portions to form channels that register with the said channels in the hub spokes respectively, the hub member having channeled portions registering with the said channeled connections of the rim spokes, and coil springs located in said channeled portions, the channeled portions having sockets therein, the coil springs having the alternate convolutions enlarged and located in said sockets.

10. In a wheel, a hub member having spokes radiating therefrom, a double rim member formed of sections, each section comprising a rim portion and a spoke portion, the sections being secured together to cause the spoke portions to form a channel with sockets therein, the hub portions having channel portions registering with the channel portions of the rim member and having socket portions opposed to said socket portions, and coil springs located in the channel portions and in the said socket portions.

11. In a wheel, a wheel member having spokes radiating therefrom, a rim member having spokes secured thereto and projecting inwardly in proximity to the spokes of the hub member, the spokes having opposed socket portions, and coil springs interposed between the spokes of the two members to receive the load between the rim and the hub and extended into the said opposed sockets of the spokes.

12. In a wheel, a hub member having channeled spokes radiating therefrom, a rim member having channeled spokes secured thereto and projecting inwardly in proximity to said spokes with the channels registering in the two sets of spokes, and coil springs secured in the said opposed registering channels and each arranged to receive and absorb strains both transversely and longitudinally of the spokes.

Signed at Corning, in the county of Steuben and State of New York, this 27 day of July, A. D. 1911.

WALTER G. KRUKE.

Witnesses:
W. S. SHERMAN,
FRANK A. CLARK.

---

Copies of this patent may be obtained for five cents each, by addressing the "Commissioner of Patents, Washington, D. C."